United States Patent
Pan et al.

(10) Patent No.: US 11,651,578 B2
(45) Date of Patent: May 16, 2023

(54) END-TO-END MODELLING METHOD AND SYSTEM

(71) Applicant: IFLYTEK CO., LTD., Hefei (CN)

(72) Inventors: Jia Pan, Hefei (CN); Shiliang Zhang, Hefei (CN); Shifu Xiong, Hefei (CN); Si Wei, Hefei (CN); Guoping Hu, Hefei (CN)

(73) Assignee: IFLYTEK CO., LTD., Hefei (CN)

( * ) Notice: Subject to any disclaimer, the term of this patent is extended or adjusted under 35 U.S.C. 154(b) by 1022 days.

(21) Appl. No.: 16/329,368

(22) PCT Filed: Jan. 11, 2017

(86) PCT No.: PCT/CN2017/070812
§ 371 (c)(1),
(2) Date: Feb. 28, 2019

(87) PCT Pub. No.: WO2018/098892
PCT Pub. Date: Jun. 7, 2018

(65) Prior Publication Data
US 2019/0279036 A1  Sep. 12, 2019

(30) Foreign Application Priority Data
Nov. 29, 2016 (CN) .......................... 201611070244.2

(51) Int. Cl.
*G06F 12/00* (2006.01)
*G06N 3/08* (2023.01)
(Continued)

(52) U.S. Cl.
CPC .............. *G06N 3/08* (2013.01); *G06N 3/049* (2013.01); *G06N 99/00* (2013.01); *G10L 15/06* (2013.01)

(58) Field of Classification Search
CPC .......... G06N 3/049; G06N 3/08; G06N 99/00; G06N 3/00; G06N 5/00; G06N 10/00; G06N 20/00; G06N 7/00
See application file for complete search history.

(56) References Cited

U.S. PATENT DOCUMENTS

| | | | |
|---|---|---|---|
| 2016/0026914 A1 | 1/2016 | Yu et al. | |
| 2016/0284347 A1 | 9/2016 | Sainath et al. | |

FOREIGN PATENT DOCUMENTS

| | | |
|---|---|---|
| CN | 102982809 | 3/2013 |
| CN | 103544392 | 1/2014 |

(Continued)

OTHER PUBLICATIONS

International Search Report and the Written Opinion issued in PCT/CN2017/070812 dated Sep. 4, 2017.
(Continued)

*Primary Examiner* — Yong J Choe
(74) *Attorney, Agent, or Firm* — Zhong Law, LLC (57) ABSTRACT

A method and a system for end-to-end modeling are provided. The method includes: determining a topological structure of a target-based end-to-end model, where the topological structure includes an input layer, an encoding layer, an code enhancement layer, a filtering layer, a decoding layer and an output layer; the code enhancement layer adds information of a target unit to a feature sequence outputted by the encoding layer, the filtering layer filters a feature sequence added with the information of the target unit; collecting multiple pieces of training data; and training parameters of the target-based end-to-end model by using the multiple pieces of the training data.

23 Claims, 8 Drawing Sheets

(51) Int. Cl.
G06N 3/049 (2023.01)
G06N 99/00 (2019.01)
G10L 15/06 (2013.01)

(56) References Cited

FOREIGN PATENT DOCUMENTS

| CN | 105551483 | 5/2016 |
|---|---|---|
| JP | 2009289262 A | 12/2009 |
| JP | 2012014617 A | 1/2012 |
| JP | 2015212731 A | 11/2015 |
| JP | 2016139176 A | 8/2016 |

OTHER PUBLICATIONS

Japanese Office Action issued in 2019-535428 dated May 13, 2020, 8 pages.
Extended European Search report issued in 17875986.6 dated Jun. 25, 2020, 11 pages.
Alex Graves et al., "Speech Recognition with Deep Recurrectn Neural Networks", ICASSP, 2013, pp. 6645-6649, IEEE International Conference on Acoustics, Speech and Signal Processing—Proceedings.
Yunghyun Cho et al., "Learning Phrase Representations Using RNN Encoder-Decoder for Statistical Machine Translation", 2014, pp. 1-15.

END-TO-END MODELLING METHOD AND SYSTEM

CROSS-REFERENCE TO RELATED APPLICATIONS

This application is a national phase application of PCT international patent application PCT/CN2017/070812, filed on Jan. 11, 2017 which claims priority to Chinese Patent Application No. 201611070244.2, titled "END-TO-END MODELLING METHOD AND SYSTEM", filed with the Chinese Patent Office on Nov. 29, 2016, both of which are incorporated herein by reference in their entireties.

FIELD

The present disclosure relates to the technical field of machine learning and in particular to a method and a system for end-to-end modeling.

BACKGROUND

End-to-end modeling refers to building a model based on a corresponding relationship between a feature sequence of an input end and a feature sequence of an output end. End-to-end modeling is widely used in the field of pattern recognition or machine learning. For example, end-to-end modeling is usually used in an application system for speech recognition, image recognition, machine translation or the like. A corresponding relationship between the input end and the output end is established to meet requirements of the application system. Taking the speech recognition as an example, end-to-end modeling refers to building a model by combining an acoustic model with a language model, to output a recognition text directly. In Chinese language, a Chinese character or word is usually served as a modeling unit, i.e., a target labeling unit. A model is built by learning a corresponding relationship between an inputted speech signal sequence and an outputted Chinese character or word.

The conventional method for end-to-end modeling is usually realized based on an Encode-Decode model, and the method includes the following steps:

(1) determining a topological structure of an Encode-Decode model;

(2) collecting multiple pieces of training data, extracting a feature sequence for each piece of the training data, and determining target labeling information in the training data; and (3) using the feature sequences of the multiple pieces of the training data and the target labeling information in the training data to train parameters of the model.

Figure 1:
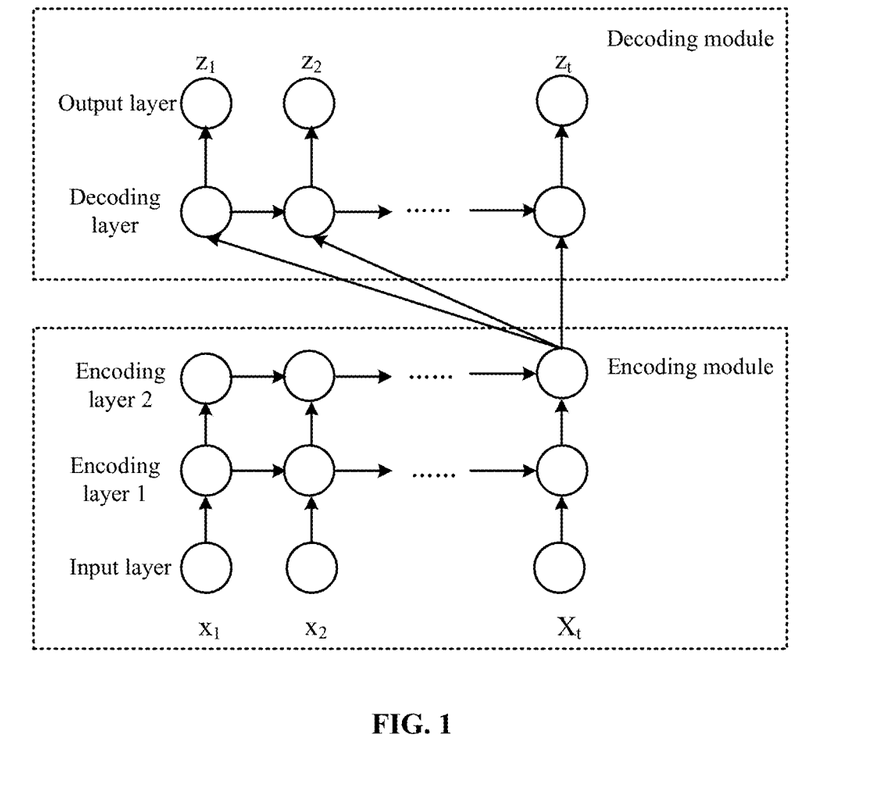
FIG. 1 is a schematic diagram of a topological structure of an Encode-Decode model in the conventional art.

A topological structure of the Encode-Decode model, as shown in FIG. 1, mainly includes an input layer, an encoding layer, a decoding layer and an output layer. The encoding layer is configured to encode a feature sequence inputted from the input layer. The decoding layer is configured to decode the encoded feature sequence. The decoded feature sequence is served as an input of the output layer, and the output layer outputs a posteriori probability of each target labeling unit.

It can be seen from FIG. 1 that, in this model, only the inputted feature sequence is encoded to acquire encoding information, and the encoding information is served as an input of the decoding layer, the encoding information is decoded by the decoding layer. In this way, the acquired encoded feature sequence may have a relatively big difference with the target labeling unit, resulting a less accurate relationship between the feature sequence of the input end and the feature sequence of the output end and thus reducing the accuracy of modeling.

SUMMARY

A method and a system for end-to-end modeling are provided in embodiments of the present disclosure, to improve accuracy of modeling.

The following technical solutions are provided by the present disclosure.

A method for end-to-end modeling includes:

determining a topological structure of a target-based end-to-end model, where the topological structure includes an input layer, an encoding layer, a code enhancement layer, a filtering layer, a decoding layer and an output layer; where the code enhancement layer is configured to add information of a target unit to a feature sequence outputted by the encoding layer, the filtering layer is configured to filter the feature sequence added with the information of the target unit by the code enhancement layer;

collecting multiple pieces of training data;

determining a labeling object of each piece of the training data, and labeling a target unit in the labeling object;

extracting a feature sequence of each piece of the training data; and training parameters of the target-based end-to-end model by using the feature sequences of the multiple pieces of the training data and labeling information of the target units in the multiple pieces of the training data, to acquire the parameters of the target-based end-to-end model.

Preferably, the number of encoding layers is one or more, and the number of nodes of each encoding layer is the same as the number of nodes of the input layer.

Preferably, each encoding layer is a Long Short Term Memory layer in a unidirectional or bidirectional Long Short Term Memory neural network, or is a convolutional layer in a convolutional neural network.

Preferably, the topological structure further includes a down sampling layer located between adjacent encoding layers.

Preferably, the number of down sampling layers is one or more.

Preferably, an input of each node of the down sampling layer is feature information of adjacent multiple nodes of the encoding layer prior to the down sampling layer.

Preferably, the information of the target unit is added to the code enhancement layer via an enhancement node, each target unit corresponds to one enhancement node, a feature vector of a target unit is inputted to the enhancement node corresponding to the target unit, and the number of code enhancement layers and the number of enhancement nodes are the same as the number of target units.

Preferably, each enhancement node is connected to all nodes of the code enhancement layer corresponding to the enhancement node; or each enhancement node is only connected to the first node of the code enhancement layer corresponding to the enhancement node.

Preferably, the number of filtering layers is the same as the number of the code enhancement layers, and each code enhancement layer is connected to one filtering layer directly.

Preferably, the filtering layer has a structure of a unidirectional or bidirectional Long Short Term Memory layer, the number of nodes of the filtering layer is the same as the number of nodes of the code enhancement layer, a feature outputted by each code enhancement layer is served as an input of the filtering layer connected to the code enhancement layer, and an output of the last node of the filtering layer is served as an output of the filtering layer; or the filtering layer has a structure of a convolutional layer and a pooling layer in a convolutional neural network, each filtering layer includes one or more convolutional layers and one pooling layer, and an output of the pooling layer is served as an output of the filtering layer including the pooling layer.

Preferably, the training parameters of the target-based end-to-end model by using the feature sequences of the multiple pieces of the training data and labeling information of the target units in the multiple pieces of the training data includes:

training the parameters of the end-to-end model by using the feature sequences of the multiple pieces of the training data as an input of the end-to-end model and using the labeling information of the target units in the multiple pieces of the training data as an output of the end-to-end model, where the parameters of the end-to-end model are converting matrices called weights and biases for connections among layers of the end-to-end model.

A system for end-to-end modeling includes:

a topological structure determining module, configured to determine a topological structure of a target-based end-to-end model, where the topological structure includes an input layer, an encoding layer, a code enhancement layer, a filtering layer, a decoding layer and an output layer; where the code enhancement layer is configured to add information of a target unit to a feature sequence outputted by the encoding layer, the filtering layer is configured to filter the feature sequence added with the information of the target unit by the code enhancement layer;

a training data collecting module, configured to collect multiple pieces of training data;

a labeling module, configured to determine a labeling object of each piece of the training data, and labeling a target unit in the labeling object;

a feature extracting module, configured to extract a feature sequence of each piece of the training data; and a parameter training module, configured to train parameters of the target-based end-to-end model by using the feature sequences of the multiple pieces of the training data and labeling information of the target units in the multiple pieces of the training data, to acquire the parameters of the target-based end-to-end model.

Preferably, the number of encoding layers is one or more, and the number of nodes of each encoding layer is the same as the number of nodes of the input layer.

Preferably, each encoding layer is a Long Short Term Memory layer in a unidirectional or bidirectional Long Short Term Memory neural network, or is a convolutional layer in a convolutional neural network.

Preferably, the topological structure further includes a down sampling layer located between adjacent encoding layers.

Preferably, the number of down sampling layers is one or more.

Preferably, an input of each node of the down sampling layer is feature information of adjacent multiple nodes of the encoding layer prior to the down sampling layer.

Preferably, the information of the target unit is added to the code enhancement layer via an enhancement node, each target unit corresponds to one enhancement node, a feature vector of a target unit is inputted to the enhancement node corresponding to the target unit, and the number of code enhancement layers and the number of enhancement nodes are the same as the number of target units.

Preferably, each enhancement node is connected to all nodes of the code enhancement layer corresponding to the enhancement node; or each enhancement node is only connected to the first node of the code enhancement layer corresponding to the enhancement node.

Preferably, the number of filtering layers is the same as the number of the code enhancement layers, and each code enhancement layer is connected to one filtering layer directly.

Preferably, the filtering layer has a structure of a unidirectional or bidirectional Long Short Term Memory layer, the number of nodes of the filtering layer is the same as the number of nodes of the code enhancement layer, a feature outputted by each code enhancement layer is served as an input of the filtering layer connected to the code enhancement layer, and an output of the last node of the filtering layer is served as an output of the filtering layer; or the filtering layer has a structure of a convolutional layer and a pooling layer in a convolutional neural network, each filtering layer includes one or more convolutional layers and one pooling layer, and an output of the pooling layer is served as an output of the filtering layer including the pooling layer.

Preferably, the parameter training module is configured to: train the parameters of the end-to-end model by using the feature sequences of the multiple pieces of the training data as an input of the end-to-end model and using the labeling information of the target units in the multiple pieces of the training data as an output of the end-to-end model, where the parameters of the end-to-end model are converting matrices called weights and biases for connections among layers of the end-to-end model.

According to the method and system for end-to-end modeling provided by embodiments of the present disclosure, a code enhancement layer and a filtering layer are added to a topological structure of a target-based end-to-end model. The code enhancement layer is configured to add labeling information of a target unit to a feature sequence outputted by an encoding layer, thus the encoded feature sequence obtained by code enhancement includes more complete information, and a difference between the encoded feature sequence and a target labeling unit is reduced effectively. The filtering layer is configured to filter the feature sequence added with the labeling information of the target unit by the code enhancement layer, to eliminate redundant information after code enhancement. The decoding layer is configured to decode the filtered feature sequence. A decoded feature sequence is served as an input of an output layer, and a feature sequence normalized by the output layer is obtained, thus effectively improving accuracy of modeling from an input end to an output end.

BRIEF DESCRIPTION OF THE DRAWINGS

In order to more clearly illustrate technical solutions in embodiments of the present disclosure or in the conventional technology, drawings used in the description of the embodiments are introduced briefly hereinafter. Apparently, the drawings described in the following illustrate some embodiments of the present disclosure, other drawings may be obtained by those ordinarily skilled in the art based on these drawings without any creative efforts.

DETAILED DESCRIPTION OF EMBODIMENTS

In order to make those skilled in the art understand the technical solutions according to the embodiments of the present disclosure better, the embodiments of the present disclosure are described in detail below in conjunction with the drawings.

In order to address the above-identified issues in a conventional method for end-to-end modeling, a method and a system for end-to-end modeling are provided in embodiments of the present disclosure. In the method and system according to the embodiment of the present disclosure, a code enhancement layer and a filtering layer are added to a topological structure of a target-based end-to-end model. That is, the topological structure of the target-based end-to-end model includes: an input layer, an encoding layer, a code enhancement layer, a filtering layer, a decoding layer and an output layer. The code enhancement layer is configured to add labeling information of a target unit to a feature sequence outputted by an encoding layer, and thus the encoded feature sequence obtained by code enhancement includes more complete information, effectively reducing a difference between the encoded feature sequence and a target labeling unit. The filtering layer is configured to filter the feature sequence added with the labeling information of the target unit by the code enhancement layer, to eliminate redundant information after code enhancement. The decoding layer is configured to decode the filtered feature sequence. A decoded feature sequence is served as an input of an output layer, and a feature sequence normalized by the output layer is obtained, thus effectively improving accuracy of modeling from an input end to an output end.

Figure 2:
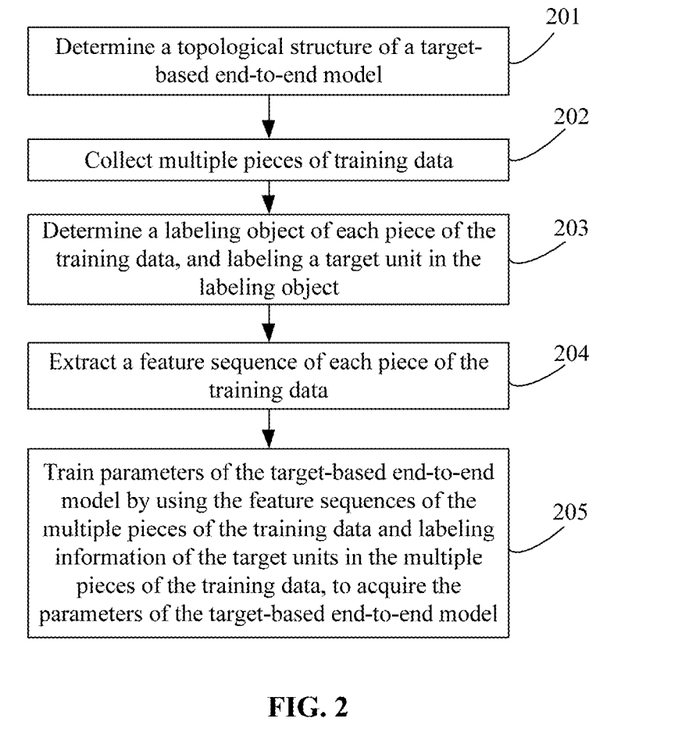
FIG. 2 is a flow chart of a method for end-to-end modeling according to an embodiment of the present disclosure.

FIG. 2 illustrates a flow chart of a method for end-to-end modeling according to an embodiment of the present disclosure. The method includes the following steps 201 to 205.

In step 201, a topological structure of a target-based end-to-end model is determined.

Compared to a conventional Encode-Decode model, a code enhancement layer and a filtering layer are added to a topological structure of the target-based end-to-end model according to the embodiment of the disclosure. Specifically, the topological structure of the end-to-end model includes an input layer, an encoding layer, a code enhancement layer, a filtering layer, a decoding layer and an output layer. The code enhancement layer is configured to add information of a target unit to a feature sequence outputted by the encoding layer, and thus the encoded feature sequence obtained by code enhancement includes more complete information, effectively reducing a difference between the encoded feature sequence and a target unit. The filtering layer is configured to filter the feature sequence added with the information of the target unit by the code enhancement layer, to eliminate redundant information after code enhancement. The decoding layer is configured to decode the filtered feature sequence. A decoded feature sequence is served as an input of an output layer to obtain a feature sequence normalized by the output layer. A specific structure of the target-based end-to-end model is described in detail hereinafter.

In step 202, multiple pieces of training data is collected.

The pieces of training data may be collected according to requirements of an application. For example, the training data may be speech data, image data, text data or the like.

In step 203, a labeling object of each piece of the training data is determined, and a target unit in the labeling object is labeled.

The target unit may be determined according to requirements of an application. Generally, the target unit is obtained by performing labeling on the labeling object of the piece of training data by a domain expert. The labeling object may also be the piece of training data.

It should be illustrated that, in practice, the target unit may be determined according to requirements of an application. For example, in a speech recognition application, the collected piece of training data is speech data, the labeling object may be a recognition text corresponding to the speech data, and a single character or a word in the recognition text may be served as a target unit. In an image recognition application, the collected piece of training data is image data, the labeling object may be a recognition text corresponding to the image data, that is, a recognition text obtained by image recognition, and a single character or a word in the recognition text is served as the target unit. In a machine translation application, the collected piece of training data is source language text data, the labeling object may be a target language text data, and a single character or a word in the target language text data is served as the target unit.

In step 204, a feature sequence of each piece of the training data is extracted.

A feature in the feature sequence may be determined according to requirements of an application. For example, in a speech recognition application, the feature may be acoustic information illustrating speech data in each speech frame, such as Filter Bank feature, MFCC feature, PLP feature. In an image recognition application, the feature may be a value of a pixel in each image frame. In a machine translation application, the feature may be a word vector of each word in a source language text data.

In step 205, parameters of the target-based end-to-end model are trained by using the feature sequences of the multiple pieces of the training data and labeling information of the target units in the multiple pieces of the training data, to acquire the parameters of the target-based end-to-end model.

A target-based end-to-end model in the embodiments of the present disclosure is described in detail below in conjunction with FIGS. 3 to 6.

Figure 3:
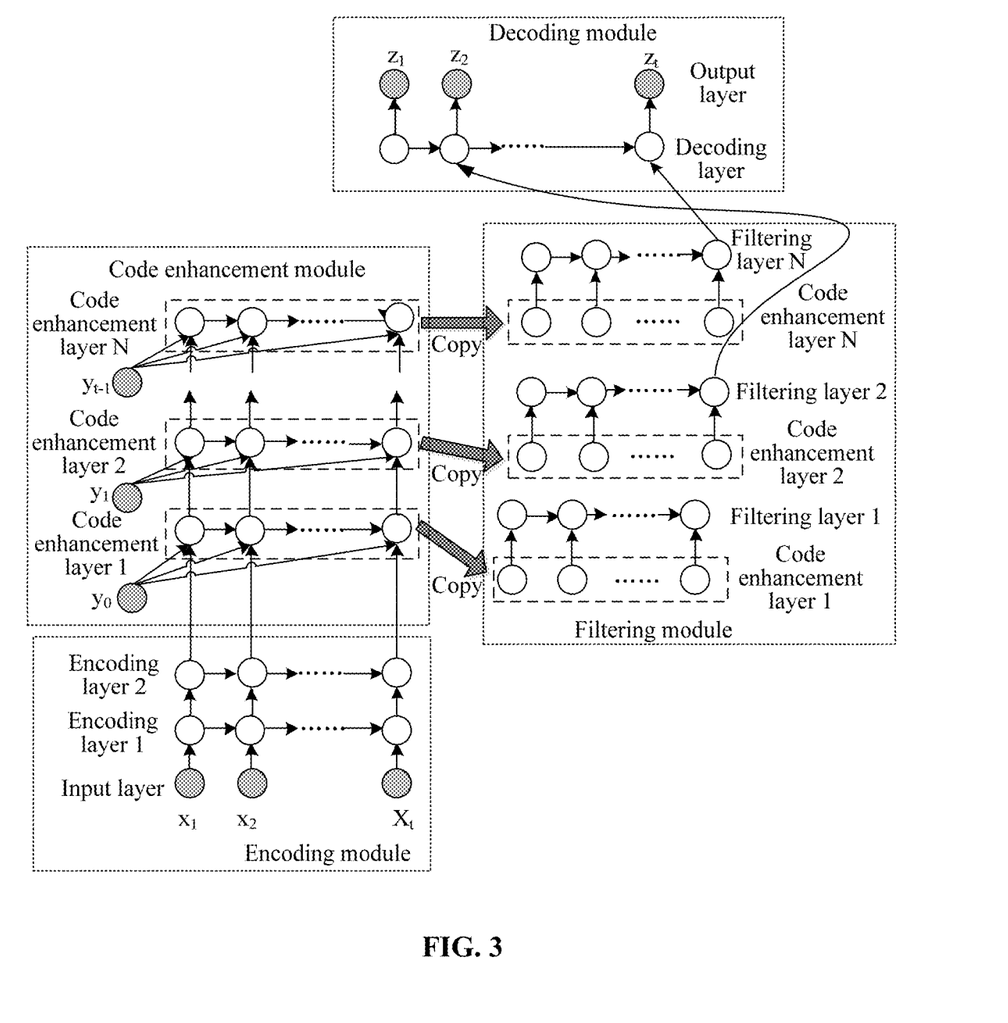
FIG. 3 is a schematic diagram of a topological structure of a target-based end-to-end model according to an embodiment of the present disclosure.

Reference is made to FIG. 3, which is a schematic diagram of a topological structure of a target-based end-to-end model according to an embodiment of the present disclosure.

The topological structure of the target-based end-to-end model includes an input layer, an encoding layer, a code enhancement layer, a filtering layer, a decoding layer and an output layer. A detailed topological structure and feature transformation among layers are described as follows.

(1) Input Layer

An input layer is used for inputting a feature sequence of a piece of training data, and the number of nodes of input layer is determined based on the feature sequence of the piece of the training data. For example, in a case that the training data is speech data, the feature sequence inputted to the input layer is speech feature of each frame of each speech. The number of nodes of the input layer is the number of frames of each speech, and is illustrated as $X=\{x_1, x_2, \ldots, x_t, \ldots, x_T\}$, where $x_t$ represents a feature vector of the t-th frame of the current training data, and T represents the number of frames of the current training data.

(2) Encoding Layer

The feature sequence inputted to the input layer is encoded by an encoding layer. The number of encoding layers is one or more. The number of nodes of each encoding layer is the same as the number of nodes of the input layer. Each encoding layer is a Long Short Term Memory layer in a unidirectional or bidirectional Long Short Term Memory neural network, or is a convolutional layer in a convolutional neural network. The structure of the encoding layer is determined according to requirements of an application. For example, for a speech recognition task with a large vocabulary having a large number of pieces of training data, the encoding layer may be a bidirectional Long Short Term Memory layer having three to five layers. For a speech recognition task in a limited domain having a small number of pieces of training data, the encoding layer may be a unidirectional Long Short Term Memory layer having one to three layers.

Further, a down sampling layer may be inserted between encoding layers to improve computation efficiency of the encoding layers. Specifically, one down sampling layer may be inserted between every two adjacent encoding layers, thus multiple down sampling layers are inserted. Alternatively, one down sampling layer may be inserted between random two adjacent encoding layers, thus only one down sampling layer is inserted. The number of nodes of the encoding layer inserted with the down sampling layer is the same as the number of nodes of the down sampling layer prior to the encoding layer. The number of nodes of the last encoding layer is the same as the number of nodes of the last down sampling layer. For example, for a task with overlapped inputted feature sequences of multiple frames such as speech recognition or image recognition, a down sampling layer may be inserted between the encoding layers, to improve the computation efficiency. For a task without overlapped inputted feature sequences such as machine translation, the down sampling layer may not be inserted between the encoding layers.

Figure 4:
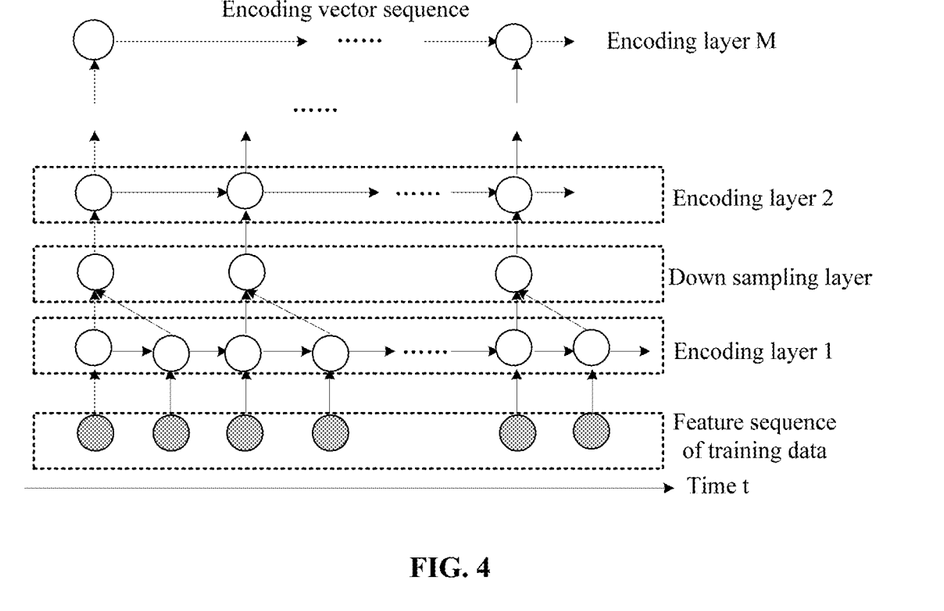
FIG. 4 is a schematic diagram of inserting a down sampling layer between encoding layers in the topological structure shown in FIG. 3 according to an embodiment of the present disclosure.

FIG. 4 is a schematic diagram of inserting a down sampling layer between the encoding layer 1 and the encoding layer 2. An input of each node of the down sampling layer is feature information of adjacent multiple nodes of the encoding layer prior to the down sampling layer. The feature information may be obtained by calculating a maximum value, a mean value or p-norm of features of multiple nodes of the encoding layer prior to the down sampling layer, to realize the object of down sampling. In FIG. 4, an input of each node of the down sampling layer is feature information of two adjacent nodes of the encoding layer prior to the down sampling layer, where M represents is a total number of the encoding layers.

A feature transformation method of the encoding layer is determined based on the structure of the encoding layer. For example, in a case that the encoding layer is a unidirectional or bidirectional Long Short Term Memory layer, an output feature sequence of the l-th encoding layer is represented as $H^l=\{h_1^l, h_1^l, \ldots, h_t^l, \ldots, h_T^l\}$, where $h_t^l \in R^{D_l \times 1}$ represents an output feature vector of the t-th frame of the l-th encoding layer. The transforming method is represented as $h_t^l = f(h_{t-1}^l, h_t^{l-1})$, where f is a unidirectional or bidirectional Long Short Term transforming function, and $D_l$ is the number of dimensions of a feature vector in each node of the l-th encoding layer.

(3) Code Enhancement Layer

Information of a target unit is added to the code enhancement layer. A feature sequence outputted by the encoding layer is enhancement, and the enhancement feature sequence includes more complete information.

The information of the target unit is added to the code enhancement layer via an enhancement node. Each target unit corresponds to one enhancement node, and a feature vector of a target unit is inputted to the enhancement node corresponding to the target unit.

Figure 5A:
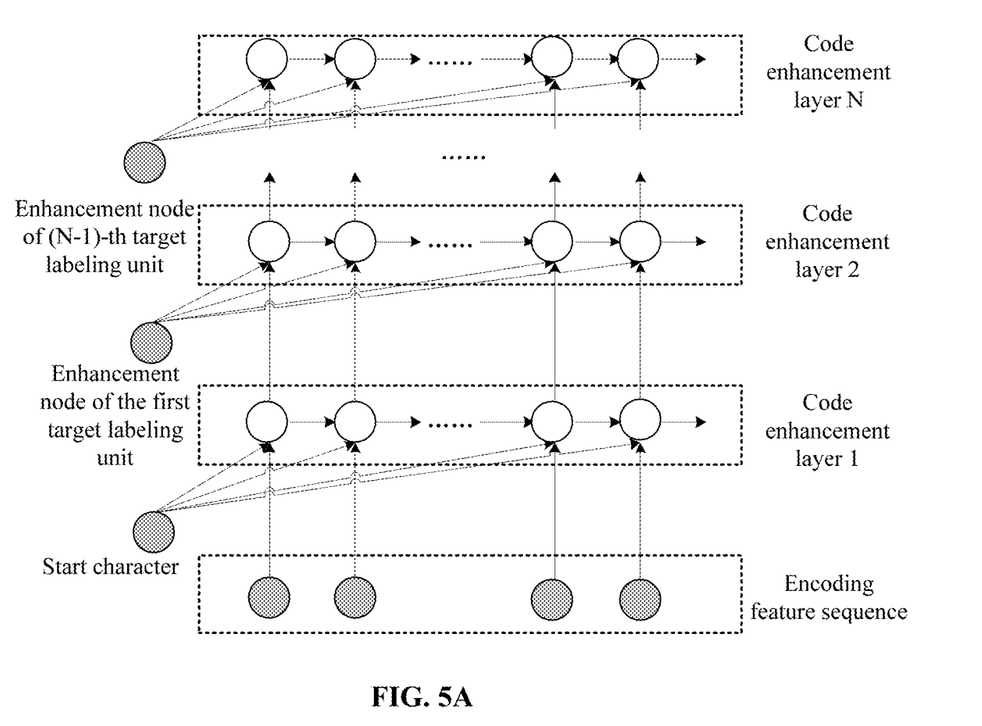
FIG. 5A is a schematic diagram of connections between enhancement nodes and nodes of a code enhancement layer according to an embodiment of the present disclosure.
Figure 5B:
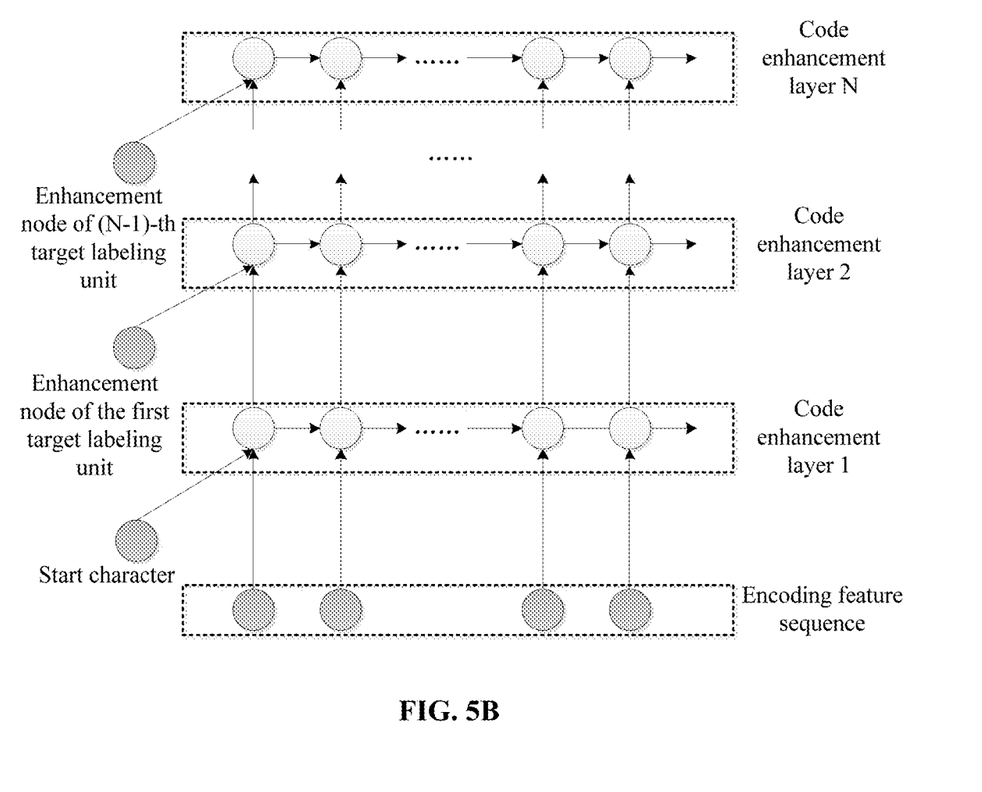
FIG. 5B is a schematic diagram of connections between enhancement nodes and nodes of a code enhancement layer according to another embodiment of the present disclosure.

There may be multiple target units in each target object, thus requiring multiple code enhancement layers. Each code enhancement layer corresponds to one enhancement node. The number of code enhancement layers and the number of enhancement nodes are the same as the number of target units. Each code enhancement layer is connected with an enhancement node corresponding to a target unit prior to the target unit corresponding to the code enhancement layer. As shown in FIGS. 5A and 5B, assuming that there are N target units in total, N code enhancement layers are required. A code enhancement layer 1 corresponds to an empty enhancement node, a code enhancement layer 2 corresponds to a first target unit, and a code enhancement layer 3 corresponds to a second target unit, and so on. That is, a code enhancement layer N corresponds to a (N−1)-th target unit, and information of the first target unit to the (N−1)-th target unit is added layer by layer. Taking speech recognition as an example, a word is served as a target unit, if labeling information of a target unit of the current speech data is "合肥 今天 的 天气", thus the number of target units is four, and four code enhancement layers and four enhancement nodes are needed to enhance the feature sequence outputted by the encoding layer. During enhancing the feature sequence outputted by the encoding layer, a code enhancement layer corresponding to the target unit "今天" is connected to an enhancement node corresponding to the target unit "合肥", and the first code enhancement layer is connected to an empty enhancement node.

Since processes to enhance the feature sequences outputted by the encoding layers using information of target units are the same, in practice, multiple code enhancement layers may be regarded as multiple times of enhancement performed on multiple target units of the labeling object by one code enhancement layer.

It should be noted that, in practice, the enhancement nodes and the code enhancement layers may be connected in different ways. For example, a first connection way is to connect each enhancement node to all nodes of the code enhancement layer corresponding to the enhancement node, which is shown in FIG. 5A. A second connection way is to connect each enhancement node to the first node of the code enhancement layer corresponding to the enhancement node, which is shown in FIG. 5B. In FIGS. 5A and 5B, N is the number of target units. It should be illustrated that, FIG. 3 merely illustrates the first connection way as shown in FIG. 5A, that is, the way of connecting each enhancement node to all nodes of the code enhancement layer corresponding to the enhancement node. The amount of calculation for the second connection way is less than the amount of calculation for the first connection way, but an enhancement effect of the first connection way is better than the enhancement effect of the second connection way.

The number of nodes of each code enhancement layer is the same as the number of nodes of the last encoding layer, and the manner to connect nodes of the code enhancement layer is the same as the manner to connect nodes of the encoding layer.

When performing feature transformation, a product of a feature vector of a target unit of each enhancement node and a connection weight of a node of the code enhancement layer is added to a feature vector of the node of the code enhancement layer.

(4) Filtering Layer

The filtering layer is configured to filter the feature sequence enhanced by the code enhancement layer. The number of filtering layers is the same as the number of the code enhancement layers, and each code enhancement layer is connected to one filtering layer directly.

Figure 6A:
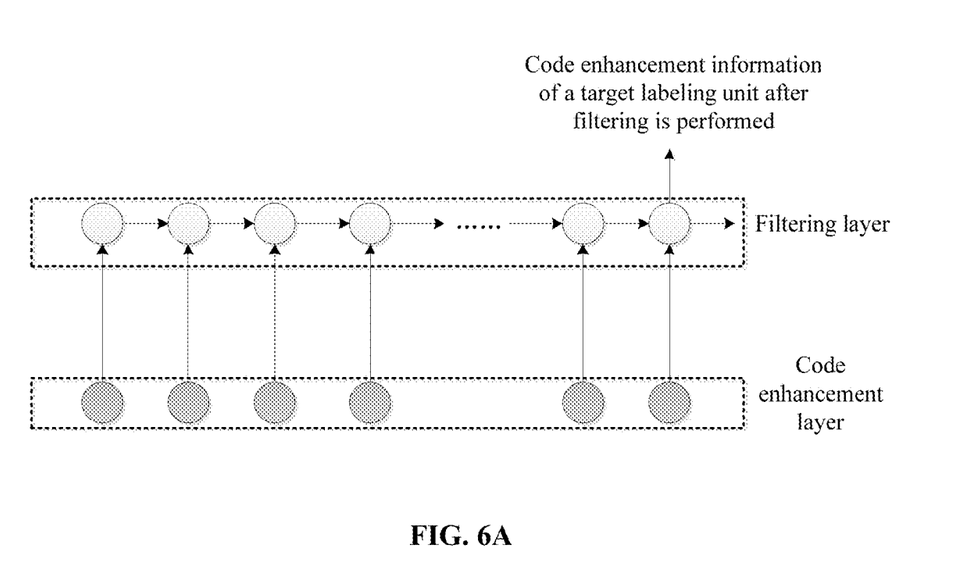
FIG. 6A is a schematic diagram of connections between a code enhancement layer and a filtering layer according to an embodiment of the present disclosure.
Figure 6B:
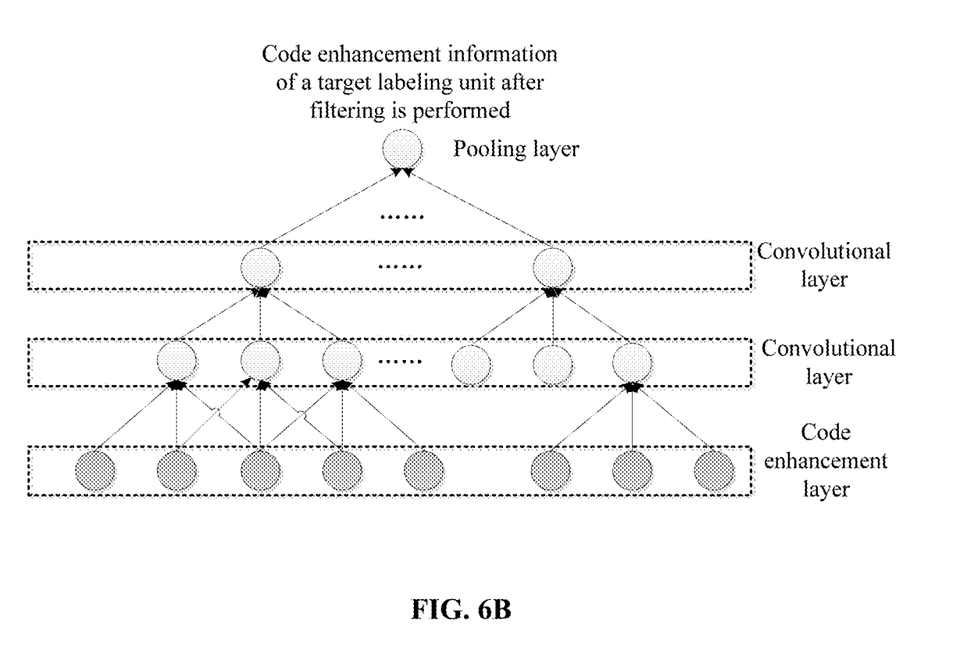
FIG. 6B is a schematic diagram of connections between a code enhancement layer and a filtering layer according to another embodiment of the present disclosure.

In practice, the filtering layer may have two types of structure as provided in the following. One type is a structure of a unidirectional or bidirectional Long Short Term Memory layer, and another type is a structure of a convolutional layer and a pooling layer in a convolutional neural network.

FIG. 6A illustrates a first connection manner for connecting a code enhancement layer to a filtering layer. When the first connection manner is used, the number of the filtering layers is the same as the number of the code enhancement layers, the number of nodes of the filtering layer is the same as the number of nodes of the code enhancement layer, a feature outputted by each code enhancement layer is served as an input of the filtering layer connected to the code enhancement layer, and an output of the last node of the filtering layer is served as an output of the filtering layer, i.e., filtered enhanced encoding information.

FIG. 6B illustrates a second connection manner for connecting the code enhancement layer to the filtering layer. When the second connection manner is used, the filtering layer has a connection manner that one or more convolutional layers are connected and then the convolutional layers are connected to a pooling layer. An output of the pooling layer is served as filtered enhanced encoding information. In this way, the enhanced encoding information is filtered and collected from each node by using multiple convolutional layers, and the enhanced encoding information is finally converged to a node. As compared with the first connection manner in which only one filtering layer is used, the second connection manner has a better filtering effect.

It should be noted that, FIG. 3 only illustrates the first connection manner shown in FIG. 6A.

A feature transformation method of the filtering layer is the same as a feature transformation method of each connection manner, which is not described here for simplicity.

(5) Decoding Layer

An input of the decoding layer is filtered enhanced encoding information outputted by each filtering layer. The decoding layer usually has a structure of a unidirectional Long Short Term Memory layer. There may be one or more decoding layers, generally, one or two decoding layers are used. The number of nodes of each decoding layer is the same as the number of the filtering layers. The detailed decoding process is the same as that in conventional technology, which is not described here.

(6) Output Layer

An output feature sequence transformed by the decoding layer is served as an input of the output layer. The output layer normalizes the input feature sequence and outputs a vector sequence of a posterior probability of each target labeling unit. The detailed method for normalizing can be found in conventional technology, and a normalization function such as softmax function may be used.

According to the topological structure of the end-to-end model, when training the model, parameters of the end-to-end model are trained by using the feature sequences of the multiple pieces of the training data as an input of the end-to-end model and using the labeling information of the target units in the multiple pieces of the training data as an output of the end-to-end model, where the parameters of the model are converting matrices called weights and biases for connections among layers of the end-to-end model. The detailed process of training the parameters can be found in conventional technology. For example, cross entropy may be used as an optimization indicator of the model, to update the parameters of the model constantly by using an error back propagation algorithm. For example, multiple iterations are applied to update the parameters of the model. The iteration process is stopped in a case that the parameters of the model reach a convergence target, thus completing the updating of the parameters of the model and obtaining parameters of the end-to-end model.

According to the method for end-to-end modeling provided in embodiments of the present disclosure, a code enhancement layer and a filtering layer are added to a topological structure of a target-based end-to-end model. After encoding an input feature sequence, a code enhancement layer is added for each target unit. Information of a target unit prior to a target unit corresponding to code enhancement layer is added to an encoding sequence by the code enhancement layer. Since historical information of the target unit is considered, the encoding feature sequence after code enhancement includes more complete information, thus effectively reducing a difference between the encoded feature sequence and a target unit. Further, a filtering layer is added after each code enhancement layer to eliminate redundant information after code enhancement. The feature sequence after code enhancement is filtered, and the filtered feature sequence is decoded. Decoded feature sequence is served as an input of the output layer, to obtain the feature sequence normalized by the output layer, thus effectively improving accuracy of modeling from an input end to an output end.

It can be understood by those skilled in the art that, all or part of steps in the method according to the above embodiments may be completed by a related hardware instructed by a program. The program may be stored in a computer readable storage medium, such as ROM/RAM, a magnetic disc, an optical disc.

Correspondingly, a computer readable storage medium is provided by the present disclosure, and the computer readable storage medium includes computer program codes, when executed by a processor, cause the processor to:

determine a topological structure of a target-based end-to-end model, where the topological structure includes an input layer, an encoding layer, a code enhancement layer, a filtering layer, a decoding layer and an output layer; where the code enhancement layer is configured to add information of a target unit to a feature sequence outputted by the encoding layer, the filtering layer is configured to filter the feature sequence added with the information of the target unit by the code enhancement layer;

collect multiple pieces of training data;

determine a labeling object of each piece of the training data, and labeling a target unit in the labeling object;

extract a feature sequence of each piece of the training data; and use the feature sequences of the multiple pieces of the training data and labeling information of the target units in the multiple pieces of the training data to train parameters of the target-based end-to-end model, to acquire the parameters of the target-based end-to-end model.

A detailed structure of the target-based end-to-end model can be referred to the descriptions stated above.

The processor trains the parameters of the end-to-end model by using the feature sequences of the multiple pieces of the training data as an input of the end-to-end model and using the labeling information of the target units in the multiple pieces of the training data as an output of the end-to-end model. The parameters of the model are converting matrices called weights and biases for connections among layers of the end-to-end model.

Figure 7:
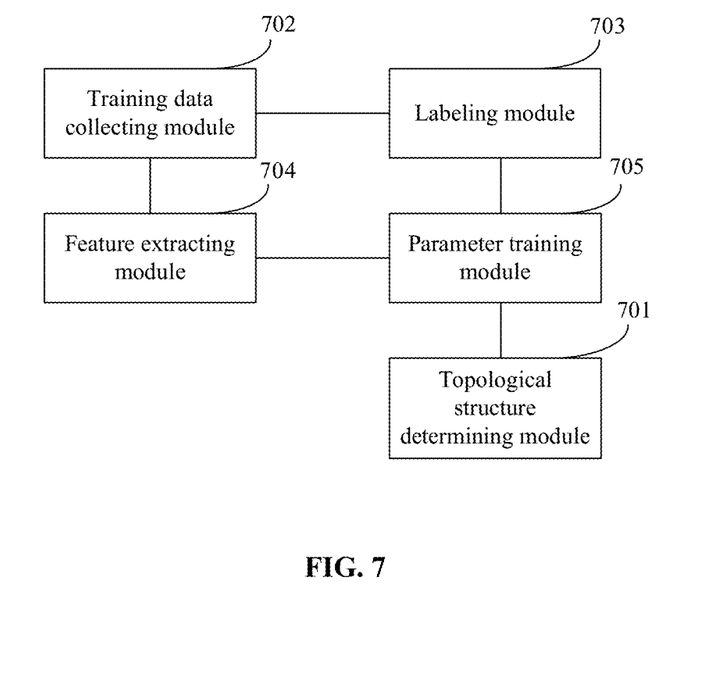
FIG. 7 is a schematic structural diagram of a system for end-to-end modeling according to an embodiment of the present disclosure.

Correspondingly, a system for end-to-end modeling is provided in an embodiment of the present disclosure. FIG. 7 is a schematic structural diagram of the system.

In the embodiment, the system includes a topological structure determining module 701, a training data collecting module 702, a labeling module 703, a feature extracting module 704 and a parameter training module 705.

The topological structure determining module 701 is configured to determine a topological structure of a target-based end-to-end model. The topological structure includes an input layer, an encoding layer, a code enhancement layer, a filtering layer, a decoding layer and an output layer. The code enhancement layer is configured to add information of a target unit to a feature sequence outputted by the encoding layer, the filtering layer is configured to filter the feature sequence added with the information of the target unit by the code enhancement layer.

The training data collecting module 702 is configured to collect multiple pieces of training data.

The labeling module 703 is configured to determine a labeling object of each piece of the training data, and to label a target unit in the labeling object.

The feature extracting module 704 is configured to extract a feature sequence of each piece of the training data.

The parameter training module 705 is configured to train parameters of the target-based end-to-end model by using the feature sequences of the multiple pieces of the training data and labeling information of the target units in the multiple pieces of the training data, to acquire the parameters of the target-based end-to-end model.

The topological structure of the target-based end-to-end model is described in detail in the above method embodiments of the disclosure, which is not repeated herein.

According to the topological structure of the target-based end-to-end model, when the parameter training module 705 trains the model, parameters of the end-to-end model are trained by using the feature sequences of the multiple pieces of the training data as an input of the end-to-end model and using the labeling information of the target units in the multiple pieces of the training data as an output of the end-to-end model, where the parameters of the model are converting matrices called weights and biases for connections among layers of the end-to-end model. The detailed process of training the parameters can be found in conventional technology, for example, cross entropy may be used as an optimization indicator of the model, to update the parameters of the model constantly by using an error back propagation algorithm. For example, multiple iterations are applied to update the parameters of the model. The iteration process is stopped when the parameters of the model reach a convergence target, thus completing the updating of the parameters of the model and obtaining parameters of the end-to-end model.

According to the system for end-to-end modeling provided in embodiments of the present disclosure, a code enhancement layer and a filtering layer are added to a topological structure of a target-based end-to-end model. After encoding an input feature sequence, a code enhancement layer is added for each target unit. Information of a target unit prior to a target unit corresponding to code enhancement layer is added to an encoding sequence by the code enhancement layer. Since historical information of the target unit is considered, the encoding feature sequence after code enhancement includes more complete information, thus effectively reducing a difference between the encoded feature sequence and a target unit. Further, a filtering layer is added after each code enhancement layer to eliminate redundant information after code enhancement. The feature sequence after code enhancement is filtered, and the filtered feature sequence is decoded. Decoded feature sequence is served as an input of the output layer, to obtain the feature sequence normalized by the output layer, thus effectively improving accuracy of modeling from an input end to an output end.

The modules in the system for end-to-end modeling in embodiments of the present disclosure may be implemented using a memory, a processing device, and other hardware components. Each of the modules may be accomplished by one or more discrete hardware components, or one hardware device integrated using multiple modules. Function of some modules may also be implemented using a software application, which is not limited herein.

It should be illustrated that, the method and system provided in embodiments of the present disclosure can be used for multiple kinds of application requirements in the mode recognition or machine learning field, such as speech recognition, image recognition, machine translation. Taking speech recognition as an example, end-to-end modeling can build a model by combining an acoustic model with a language model, to output a recognition text directly. In Chinese language, a Chinese character or word is usually served as a modeling unit, i.e., a target unit, a model is built by learning a corresponding relationship between an inputted speech signal sequence and an outputted Chinese character or word.

The embodiments in this specification are described in a progressive manner. For the same or similar parts between the embodiments, one may refer to the description of other embodiments. Each embodiment lays emphasis on differences from other embodiments. Since the system embodiment is similar to the method embodiment, the description for the system embodiment is relatively simple. For related parts, reference may be made to description in the method embodiment. The system embodiment described above are merely illustrative, and units described as separate components may or may not be physically separated. The components shown as units may be or not be physical units, i.e., the units may be located at the same place or may be distributed onto multiple network units. All or a part of the modules may be selected based on actual needs to realize the objective of the solutions according to the embodiments. The solutions according to the embodiments can be understood and implemented by those skilled in the art without creative work.

The embodiments of the disclosure are described in detail in the above content. The present disclosure is described by specific embodiments in the specification. The above description for embodiments is only for helping to understand the method and system of the present disclosure. For those skilled in the art, modification can be made to the specific embodiments and the application scopes based on the concept of the present disclosure, as above, the specification should not be understood to limit the present disclosure.

The invention claimed is:

1. A method for end-to-end modeling, comprising:
determining a topological structure of a target-based end-to-end model, wherein the topological structure comprises an input layer, an encoding layer, a code enhancement layer, a filtering layer, a decoding layer, and an output layer, wherein the code enhancement layer is configured to add information of a target unit to a feature sequence outputted by the encoding layer, the filtering layer is configured to filter the feature sequence added with the information of the target unit by the code enhancement layer;
collecting a plurality of pieces of training data;
determining a labeling object of each piece of the training data, and labeling a target unit in the labeling object;
extracting a feature sequence of each piece of the training data; and
training parameters of the target-based end-to-end model by using feature sequences of the plurality of pieces of the training data and labeling information of the target units in the plurality of pieces of the training data, to acquire the parameters of the target-based end-to-end model.

2. The method according to claim 1, wherein the number of encoding layers is one or more, and the number of nodes of each encoding layer is the same as the number of nodes of the input layer.

3. The method according to claim 2, wherein each encoding layer is a Long Short Term Memory layer in a unidirectional or bidirectional Long Short Term Memory neural network, or is a convolutional layer in a convolutional neural network.

4. The method according to claim 1, wherein the topological structure further comprises a down sampling layer located between adjacent encoding layers.

5. The method according to claim 4, wherein the number of down sampling layers is one or more.

6. The method according to claim 4, wherein an input of each node of the down sampling layer is feature information of a plurality of adjacent nodes of the encoding layer prior to the down sampling layer.

7. The method according to claim 1, wherein the information of the target unit is added to the code enhancement layer via an enhancement node, each target unit corresponds to one enhancement node, a feature vector of a target unit is inputted to the enhancement node corresponding to the target unit, and the number of code enhancement layers and the number of enhancement nodes are the same as the number of target units.

8. The method according to claim 7, wherein
each enhancement node is connected to all nodes of the code enhancement layer corresponding to the enhancement node; or
each enhancement node is only connected to the first node of the code enhancement layer corresponding to the enhancement node.

9. The method according to claim 7, wherein the number of filtering layers is the same as the number of the code enhancement layers, and each code enhancement layer is connected to one filtering layer directly.

10. The method according to claim 9, wherein
the filtering layer has a structure of a unidirectional or bidirectional Long Short Term Memory layer, the number of nodes of the filtering layer is the same as the number of nodes of the code enhancement layer, a feature outputted by each code enhancement layer is served as an input of the filtering layer connected to the code enhancement layer, and an output of the last node of the filtering layer is served as an output of the filtering layer; or
the filtering layer has a structure of a convolutional layer and a pooling layer in a convolutional neural network, each filtering layer comprises one or more convolutional layers and one pooling layer, and an output of the pooling layer is served as an output of the filtering layer comprising the pooling layer.

11. The method according to claim 1, wherein the training parameters of the target-based end-to-end model by using the feature sequences of the plurality of pieces of the training data and labeling information of the target units in the plurality of pieces of the training data comprises:
training the parameters of the end-to-end model by using the feature sequences of the plurality of pieces of the training data as an input of the end-to-end model and using the labeling information of the target units in the plurality of pieces of the training data as an output of the end-to-end model, wherein the parameters of the end-to-end model are converting matrices called weights and biases for connections among layers of the end-to-end model.

12. A system for end-to-end modeling, comprising:
a topological structure determining module, configured to determine a topological structure of a target-based end-to-end model, wherein the topological structure comprises an input layer, an encoding layer, a code enhancement layer, a filtering layer, a decoding layer, and an output layer, wherein the code enhancement layer is configured to add information of a target unit to a feature sequence outputted by the encoding layer, the filtering layer is configured to filter the feature sequence added with the information of the target unit by the code enhancement layer;
a training data collecting module, configured to collect a plurality of pieces of training data;
a labeling module, configured to determine a labeling object of each piece of the training data, and labeling a target unit in the labeling object;
a feature extracting module, configured to extract a feature sequence of each piece of the training data; and
a parameter training module, configured to train parameters of the target-based end-to-end model by using feature sequences of the plurality of pieces of the training data and labeling information of the target units in the plurality of pieces of the training data, to acquire the parameters of the target-based end-to-end model.

13. The system according to claim 12, wherein the number of encoding layers is one or more, and the number of nodes of each encoding layer is the same as the number of nodes of the input layer.

14. The system according to claim 13, wherein each encoding layer is a Long Short Term Memory layer in a unidirectional or bidirectional Long Short Term Memory neural network, or is a convolutional layer in a convolutional neural network.

15. The system according to claim 12, wherein the topological structure further comprises a down sampling layer located between adjacent encoding layers.

16. The system according to claim 15, wherein the number of down sampling layers is one or more.

17. The system according to claim 15, wherein an input of each node of the down sampling layer is feature information of a plurality of adjacent nodes of the encoding layer prior to the down sampling layer.

18. The system according to claim 12, wherein the information of the target unit is added to the code enhancement layer via an enhancement node, each target unit corresponds to one enhancement node, a feature vector of a target unit is inputted to the enhancement node corresponding to the target unit, and the number of code enhancement layers and the number of enhancement nodes are the same as the number of target units.

19. The system according to claim 18, wherein
each enhancement node is connected to all nodes of the code enhancement layer corresponding to the enhancement node; or
each enhancement node is only connected to the first node of the code enhancement layer corresponding to the enhancement node.

20. The system according to claim 18, wherein the number of filtering layers is the same as the number of the code enhancement layers, and each code enhancement layer is connected to one filtering layer directly.

21. The system according to claim 20, wherein
the filtering layer has a structure of a unidirectional or bidirectional Long Short Term Memory layer, the number of nodes of the filtering layer is the same as the number of nodes of the code enhancement layer, a feature outputted by each code enhancement layer is served as an input of the filtering layer connected to the code enhancement layer, and an output of the last node of the filtering layer is served as an output of the filtering layer; or
the filtering layer has a structure of a convolutional layer and a pooling layer in a convolutional neural network, each filtering layer comprises one or more convolutional layers and one pooling layer, and an output of the pooling layer is served as an output of the filtering layer comprising the pooling layer.

22. The system according to claim 12, wherein the parameter training module is configured to:
train the parameters of the end-to-end model by using the feature sequences of the plurality of pieces of the training data as an input of the end-to-end model and using the labeling information of the target units in the plurality of pieces of the training data as an output of the end-to-end model, wherein the parameters of the end-to-end model are converting matrices called weights and biases for connections among layers of the end-to-end model.

23. A method for end-to-end modeling, comprising:
determining a topological structure of a target-based end-to-end model, wherein the topological structure comprises an input layer, an encoding layer, a code enhancement layer, a filtering layer, a decoding layer and an output layer; wherein the code enhancement layer is configured to add information of a target unit to a feature sequence outputted by the encoding layer, the filtering layer is configured to filter the feature sequence added with the information of the target unit by the code enhancement layer;
collecting a plurality of pieces of training data; and
training parameters of the target-based end-to-end model by using the plurality of pieces of the training data, to acquire the parameters of the target-based end-to-end model.

* * * * *